Aug. 27, 1968    B. S. KARLSSON    3,398,446
DEVICE FOR APPLYING TRACTION-AUGMENTING STUDS
IN TIRES FOR VEHICLES AND THE LIKE
Original Filed Sept. 14, 1964    2 Sheets-Sheet 1
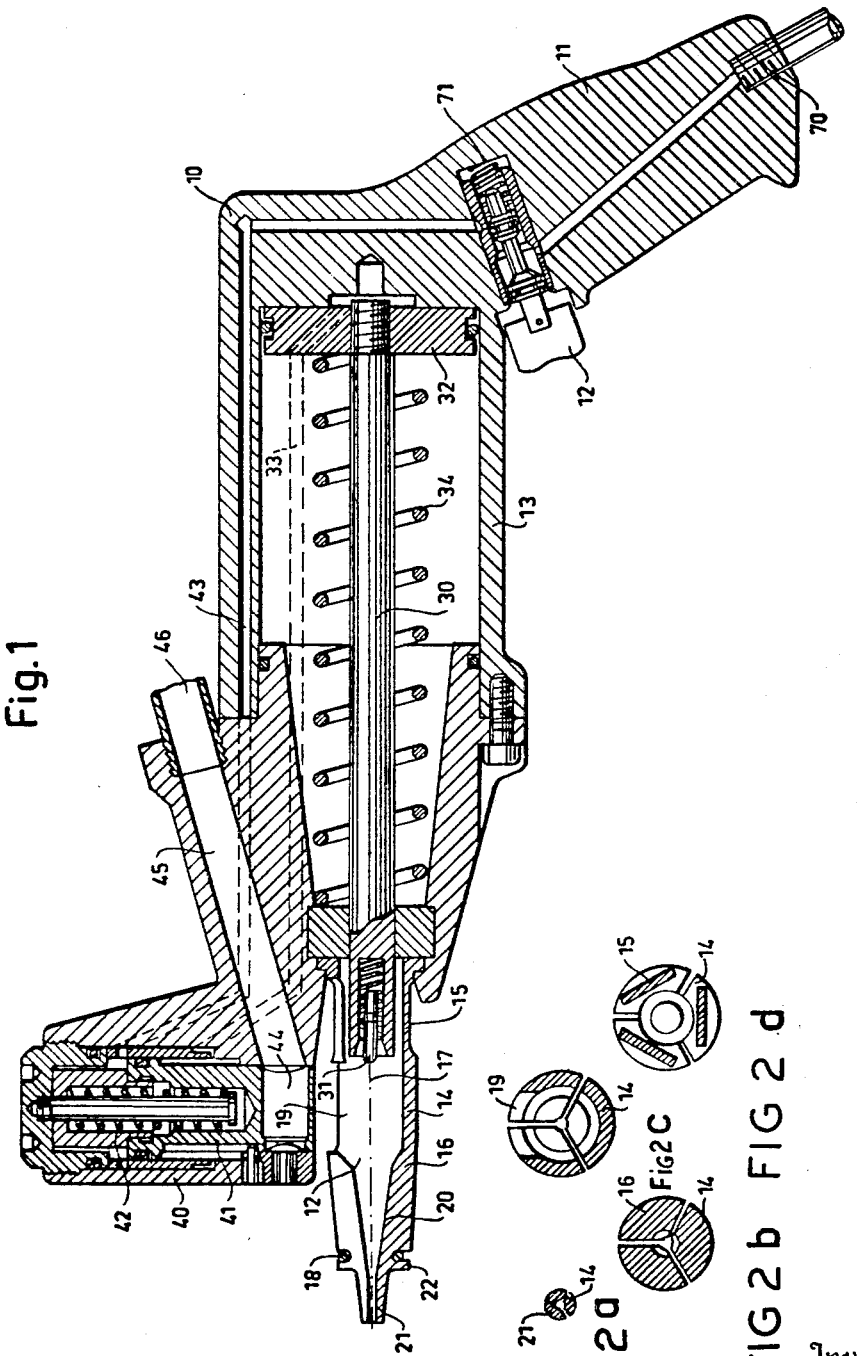
Fig.1
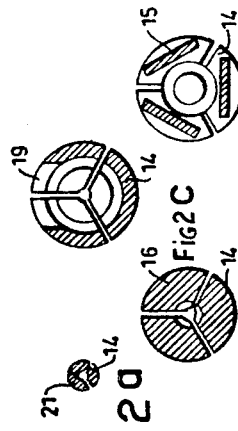
Inventor
Bengt Sigvard Karlsson,
By Pierce, Scheffler & Parker
Attorneys Fig. 3
Fig. 4
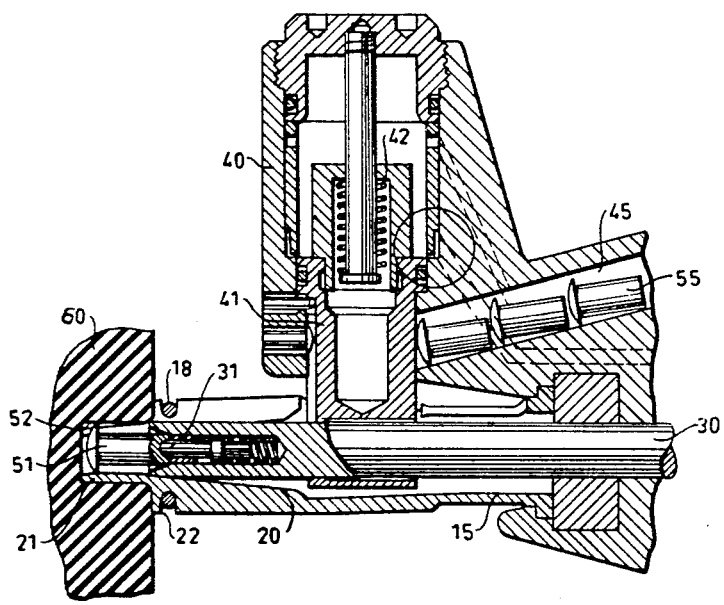
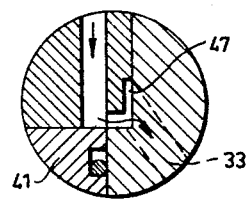
Fig. 5
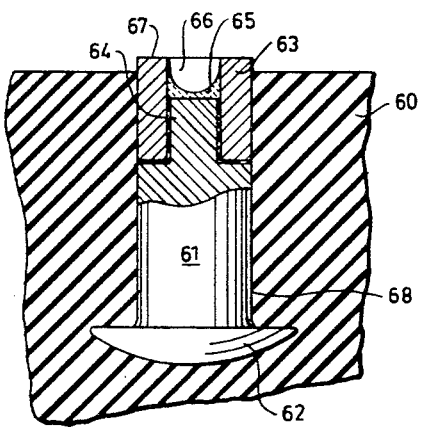

United States Patent Office 3,398,446
Patented Aug. 27, 1968

3,398,446
DEVICE FOR APPLYING TRACTION-AUGMENTING STUDS IN TIRES FOR VEHICLES AND THE LIKE
Bengt Sigvard Karlsson, Enskede, Sweden, assignor to Sandvikens Jernberks Aktiebolag, Sandviken, Sweden, a corporation of Sweden
Continuation of application Ser. No. 396,091, Sept. 14, 1964. This application Feb. 16, 1966, Ser. No. 527,892
Claims priority, application Sweden, Sept. 17, 1963, 10,137/63
5 Claims. (Cl. 29—212)

ABSTRACT OF THE DISCLOSURE

An apparatus for inserting studs in previously provided bores in the rubber tread of a common standard tire includes (1) a pneumatically operated, tubular and radially expandable device for temporarily widening the bore in the tire, (2) a first mechanism for feeding studs from a source thereof into the tubular expandable device, and (3) a second mechanism for forcing a stud through the tubular expandable device and into the transiently widened bore. Said tubular device comprises a tubular sleeve and a nozzle (for insertion into the bore) constituted by a plurality of resiliently flexible fingers integral with the tubular sleeve.

---

This application is a continuation of application Ser. No. 396,091, filed Sept. 14, 1964, now abandoned.

The present invention relates to a device for mounting of traction-augmenting, skid-preventing, studs in vehicle tires. The invention provides a rapid, effective and cheap fastening of the studs, so that a satisfactory protection against skidding can be obtained at a reasonable cost, which is an important advantage with regard to the substantial accident risks involved in car driving on icy roads. The invention is also useful for inserting studs for other similar purposes such as increasing the traction effect of road graders or preventing slippage between airplane tires and the ground.

The invention provides means for inserting studs in common standard tires after making bores therein for receiving the studs. Said means comprises a tubular, radially expandable, device which is used for temporarily widening the bores in the tire whilst the studs are being inserted. According to a preferred embodiment of the invention, the device is pneumatically operated, and is provided with (1) a first mechanism for feeding studs from a magazine into the expandable device and (2) a second mechanism for pushing the studs along the expandable tubular device into bores provided therefor in the tire. The expandable tubular device can suitably comprise a tubular sleeve one end of which is split, by a plurality of spaced longitudinal seams, into resiliently flexible fingers forming a nozzle for insertion into the bore.

In the drawing accompanying and forming a part of this specification and showing an embodiment of the invention:

FIG. 1 is a sectional view of a "gun" for inserting studs into bores located in a tire;

FIGS. 2a, 2b, 2c and 2d are cross-sections of an expandable sleeve member of the "gun" shown in FIG. 1, the position of each section being indicated in FIG. 1 by section lines a—a, b—b, c—c, and d—d in FIG. 1 opposite thereto;

FIG. 3 is a fragmentary view of a portion of the "gun" illustrated in FIG. 1, shown during insertion of a stud into a tire;

FIG. 4 is an enlarged detail of FIG. 3; and

FIG. 5 is a section of a tire with a partial longitudinal section of a stud inserted into a bore in the tire.

As appears from FIG. 1, the device 10 for inserting studs into a tire is shaped like a gun with a butt-like handle 11 and a trigger 12 mounted at one end of a tubular casing 13. At the opposite end of the tubular casing there is a device for insertion of the studs comprising a sleeve 14 which, in order to be radially expandable, is divided longitudinally into three parts 16a, 16b, 16c along the major part of its length as appears more clearly from the sections in FIGS. 2a–2d. The rearmost part 16a of the sleeve is not divided, and the same comprises a cylindrical portion with a flange for fastening the sleeve in the gun. The rear portion 15 of each part 16 is thinner than the fore portion and is resilient, so that the parts 16 can bend radially outwardly from the axis 17. In order to increase the spring force in the rear portions 15, for restoring the parts 16 to their contracted position, there can be associated therewith a resilient ring 18 of rubber, or a wound spring, or other known resilient device around the fore part of the sleeve 14. At the upper part of sleeve 14 there is provided an opening 19 for permitting the insertion of a stud into the sleeve. The inside 20 of the fore part of the sleeve is conical and tapers forwardly. The foremost part of the sleeve is formed as a nozzle 21 and has at its outside a shoulder 22 forming an abutment against the tire when a stud is inserted in a bore in a tire.

The mechanism for inserting a stud into a bore provided in a tire comprises a rod 30 which is reciprocatingly movable along the center of the tubular casing 13. The rod 30 has at its fore end a device shaped in accordance with the stud to be employed, said device comprising a resiliently fastened lug 31 matching a corresponding recess in that end of the stud which is to be situated outwardly in the tire. The rod 30 is provided with a pneumatic piston 32, the rear side of which can be put under air pressure from a channel 33 marked by broken lines. The rod is restored to its initial position by a spring 34.

For feeding studs into sleeve 14 there is provided a feeding mechanism 40 disposed above the opening 19 having its casing rigidly connected to the tubular casing 13 of the gun. The feeding mechanism comprises a movable slide 41, which when not in operation is held in raised position by a spring 42. By an air pressure channel 43 the top of slide 41 can be put under air pressure, so that the slide is urged downwardly. The lower part of the slide is provided with a chamber 44 into which a stud can be brought from a delivery tube 45. The studs are fed through a tube 45 from a magazine, which magazine can consist of a plastic tube 46. If the plastic tube is sufficiently long and its rear end held raised, the feeding is performed gravitationally by the weight of the studs in the magazine. It is also possible to effect feeding by blowing air along the tubes 46 and 45.

The supply of compressed air to the slide 41 and the piston 32 is obtained by connecting a coupling 70 to a container for air under pressure.

After opening the valve 71, which is operated by the trigger 12, the sequence of function is automatic. The trigger valve opens the connection between the air pressure source and the channel 43, thereby putting the slide 41 under pressure and moving it downwardly. When the slide 41 has reached its bottom position a connecting channel 47 between the channel 43 and the channel 33 is opened as illustrated in FIG. 4, allowing compressed air to pass into the channel 33, thereby putting the piston 32 under pressure. This causes movement of the piston 32 and the rod 30, and a stud, which has been brought into the sleeve 14, is pushed forwardly by the rod 30.

FIG. 3 shows the slide 41 in its lower position and the rod 30 on its way forwardly to insert a stud 51 into a bore 52 of a tire 60. Other studs 55 are shown in the magazine 46. The bore 52 must have a bottom at such a depth that the outer end of the stud secures a suitable position in relation to the peripheral surface of the tire when the inner end of the stud abuts against the bottom of the bore. When the head of the stud has reached the bottom of the bore, the stud cannot move any farther, and the continued movement of the rod pushes the whole gun rearwardly, so that the nozzle 21 is withdrawn from the bore 52 and the walls of the bore are contracted around the stud under influence of the elasticity of the rubber.

For inserting studs in a tire the magazine is filled with studs, and the nozzle 21 is inserted into the bore 52 in the tire 60, the shoulder 22 resting against the surface of the tire. The trigger 12 is operated, after which the slide 41 takes a stud into the sleeve 14 and the rod 30 pushes the stud along the sleeve in the way above described. As the head of the stud passes along the conical surface 20 the sleeve is expanded radially and the bore 52 is widened. When the stud has reached the bottom of the bore the gun is expelled from the bore. After releasing the trigger the compressed air is evacuated rearwardly along the circuit, the movable parts are restored to their original positions, and another stud is brought into the slide chamber from the magazine.

In the above-described embodiment it has been assumed that the studs have the shape shown in FIG. 5. The invention can of course be used also for other kinds of studs, but then the fore end of the rod 30 should be adapted to cooperate with the shape of the stud. In FIG. 5 is shown a section of a part of a tire 60 and a partial longitudinal section of a stud 61. The rear or bottom end of the stud has a head 62 in order that the stud is held firmly by the surrounding rubber material. The rear part of the stud comprising the head 62 and a shaft portion 68, is usually made of steel. At the exposed end portion of the stud there is or may be provided a wear-resistant member 63 of sintered hard metal having a tubular shape, and the member 63 being placed coaxially on a lug 64 protruding from the shaft 68 of the stud. Member 63 is fastened to the shaft and the lug 64 by brazing, the brazing material 65 forming a concave surface at the bottom of the cavity 66 in the center of the stud. The pin 31 in the gun above described is adapted to enter the central hole of the tubular member 63, thereby holding the stud in the correct position during its insertion into the tire. The tubular member 63 provides a wear-resistant surface 67 of sintered hard metal at the periphery of the tire. The cavity 66 at the center of the wear surface improves the tractionability of the stud.

I claim:

1. Device for inserting traction-augmenting studs in bores provided in the wear surface of a vehicle tire or the like, comprising means forming a tubular passageway for receiving a stud therein, the fore part of said passageway-forming means terminating in an expandable-contractable outlet, which outlet in contracted condition is insertable into a previously made bore in such wear surface;

means forming a stop shoulder on said device for limiting the depths of penetration of said outlet into such bore;

in communication with said passageway-forming means a magazine for holding a supply of studs;

means for forwarding a stud from said magazine into said passageway-forming means; and a reciprocating piston rod for forcing a stud which has been inserted into said passageway-forming means in the direction towards said outlet, the diameter of the longitudinal channel of that part of said passageway-forming means comprising said outlet being, when the outlet is in contracted condition, smaller than the diameter of such stud, that part of said passageway-forming means comprising said outlet being divided into at least three circumferentially spaced, radially movable sections, movement of said piston rod forwarding such stud in the channel of said outlet effecting radial expansion of said outlet to an extent sufficient, when said outlet has been inserted into such bore, to expand said bore throughout its length in all lateral directions so as to accept such stud therein.

2. Device according to claim 1 in which said means forming a tubular passageway includes a sleeve having the end opposite to said outlet shaped as a unitary cylinder, said radially movable sections being fastened to said cylinder by resilient portions, said radially movable sections and their resilient portions being unitary with said cylinder.

3. Device according to claim 1 in which said means forming a tubular passageway has an inward section that tapers in the direction towards the nozzle in such a way that the radial expansion of the outlet is caused by the wedge effect arising from the movement of said piston rod bringing a stud with it along said means forming a tubular passageway.

4. Device for inserting traction-augmenting studs in bores provided in the wear surface at a vehicle tire or the like, comprising tubular means for receiving a stud therein, one end of said tubular means being shaped as a nozzle forming an elongated fore part which in contracted condition is insertable into a previously made bore in said wear surface and shoulder members limiting the depth of penetration of said fore part into such bore; a magazine for holding a supply of studs; means for forwarding a stud from said magazine into said tubular means; and a reciprocating piston rod for pushing said stud inserted into said tubular means in the direction towards said nozzle, at least that part of said tubular means comprising said nozzle being divided into at least three longitudinal sections situated side by side around the periphery of the tubular means, thus allowing radial expansion of said nozzle thereby expanding said bore throughout its length in all lateral directions, each section having one of said shoulder members.

5. Device for inserting traction-augmenting studs in blind bores provided in the wear surface of a vehicle tire or the like, which comprises tubular means for receiving a stud therein, one end of said tubular means being shaped as a nozzle forming an elongated fore part which is contracted condition is insertable into a previously made bore in such wear surface;

means forming a stop shoulder, carried by said tubular means for limiting the depth of penetration of said fore part into such bore;

a magazine for holding a supply of studs;

means for forwarding a stud from said magazine into said tubular means; and a reciprocating piston rod for pushing said stud inserted into said tubular means in the direction towards said nozzle, at least that part of said tubular means comprising said nozzle being divided into at least three longitudinal sections situated side by side around the periphery of the tubular means, thus allowing radial expansion of said nozzle thereby expanding said bore throughout its length in all lateral directions whilst the penetration of said nozzle into the so-expanded bore is limited by said stop shoulder-forming means.

References Cited

UNITED STATES PATENTS

| | | | |
|---|---|---|---|
| 916,026 | 3/1909 | Sasseman | 227—149 |
| 2,445,674 | 7/1948 | Kendall | 227—112 |
| 2,956,282 | 10/1960 | McIlvin | 227—119 |
| 3,134,981 | 6/1964 | Demetrakopoulos et al. | 227—114 |
| 3,258,835 | 7/1966 | Boggild et al. | 29—212 |

FOREIGN PATENTS

| | | |
|---|---|---|
| 4,023,401 | 12/1962 | Japan. |
| 732,437 | 4/1966 | Canada. |

THOMAS H. EAGER, *Primary Examiner.*

UNITED STATES PATENT OFFICE
CERTIFICATE OF CORRECTION

Patent No. 3,398,446                                              August 27, 1968

Bengt Sigvard Karlsson

It is certified that error appears in the above identified patent and that said Letters Patent are hereby corrected as shown below:

Column 4, line 32, "nozzle" should read -- outlet --; line 61, "is" should read -- in --.

Signed and sealed this 3rd day of March 1970.

(SEAL)
Attest:

Edward M. Fletcher, Jr.                        WILLIAM E. SCHUYLER, JR.
Attesting Officer                                     Commissioner of Patents